ically from one or both front faces (24, 26) of the laminated
United States Patent
Schmohl et al.

(10) Patent No.: US 7,696,663 B2
(45) Date of Patent: Apr. 13, 2010

(54) ROTOR FOR A FORCED-AIR-COOLED ELECTRIC MOTOR

(75) Inventors: Michael Schmohl, Ammerbuch (DE);
Norbert Falter, Nuertingen (DE);
Dietrich Holzwarth, Aichwald (DE)

(73) Assignee: Metabowerke GmbH, Nuertingen (DE)

( * ) Notice: Subject to any disclaimer, the term of this patent is extended or adjusted under 35 U.S.C. 154(b) by 0 days.

(21) Appl. No.: 12/223,691

(22) PCT Filed: Apr. 6, 2006

(86) PCT No.: PCT/EP2006/003146
§ 371 (c)(1),
(2), (4) Date: Aug. 7, 2008

(87) PCT Pub. No.: WO2007/118483
PCT Pub. Date: Oct. 25, 2007

(65) Prior Publication Data
US 2009/0051230 A1    Feb. 26, 2009

(51) Int. Cl.
*H02K 3/48* (2006.01)
*H02K 3/34* (2006.01)
(52) U.S. Cl. ................................ 310/215; 310/214
(58) Field of Classification Search ......... 310/214–215, 310/50, 62, 261, 264
See application file for complete search history.

(56) References Cited

U.S. PATENT DOCUMENTS

| 5,449,963 | A | * | 9/1995 | Mok | 310/270 |
| 5,731,651 | A | * | 3/1998 | Hyodo | 310/261 |
| 6,133,668 | A | * | 10/2000 | Huang et al. | 310/261 |
| 7,449,810 | B2 | * | 11/2008 | Yokota et al. | 310/264 |
| 2004/0145267 | A1 | * | 7/2004 | Lowry et al. | 310/215 |
| 2007/0085439 | A1 | * | 4/2007 | Smigelski | 310/215 |

FOREIGN PATENT DOCUMENTS

| DE | 904 205 | 2/1954 |
| DE | 36 29 050 | 3/1988 |
| EP | 0 261 306 | 3/1988 |

* cited by examiner

*Primary Examiner*—Quyen Leung
*Assistant Examiner*—Leda Pham
(74) *Attorney, Agent, or Firm*—Paul Vincent

(57) ABSTRACT

A rotor (2) for a forced-air-cooled electric motor, in particular a universal motor, especially for use with electrical power tools, has a laminated armature (6) incorporating longitudinal slots (8) and with wire windings of a coil (10) protruding from the longitudinal slots (8) on the front face where the windings form coil connecting heads (20, 22). Some or all of the longitudinal slots (8) in the laminated armature (6) contain a rod (28) aligned in the longitudinal direction and protruding axially from one or both front faces (24, 26) of the laminated armature (6), whereby the protruding rod ends thus surround the coil connecting heads (20, 22) on the respective front face to protect the coil connecting heads from abrasive wear.

8 Claims, 1 Drawing Sheet

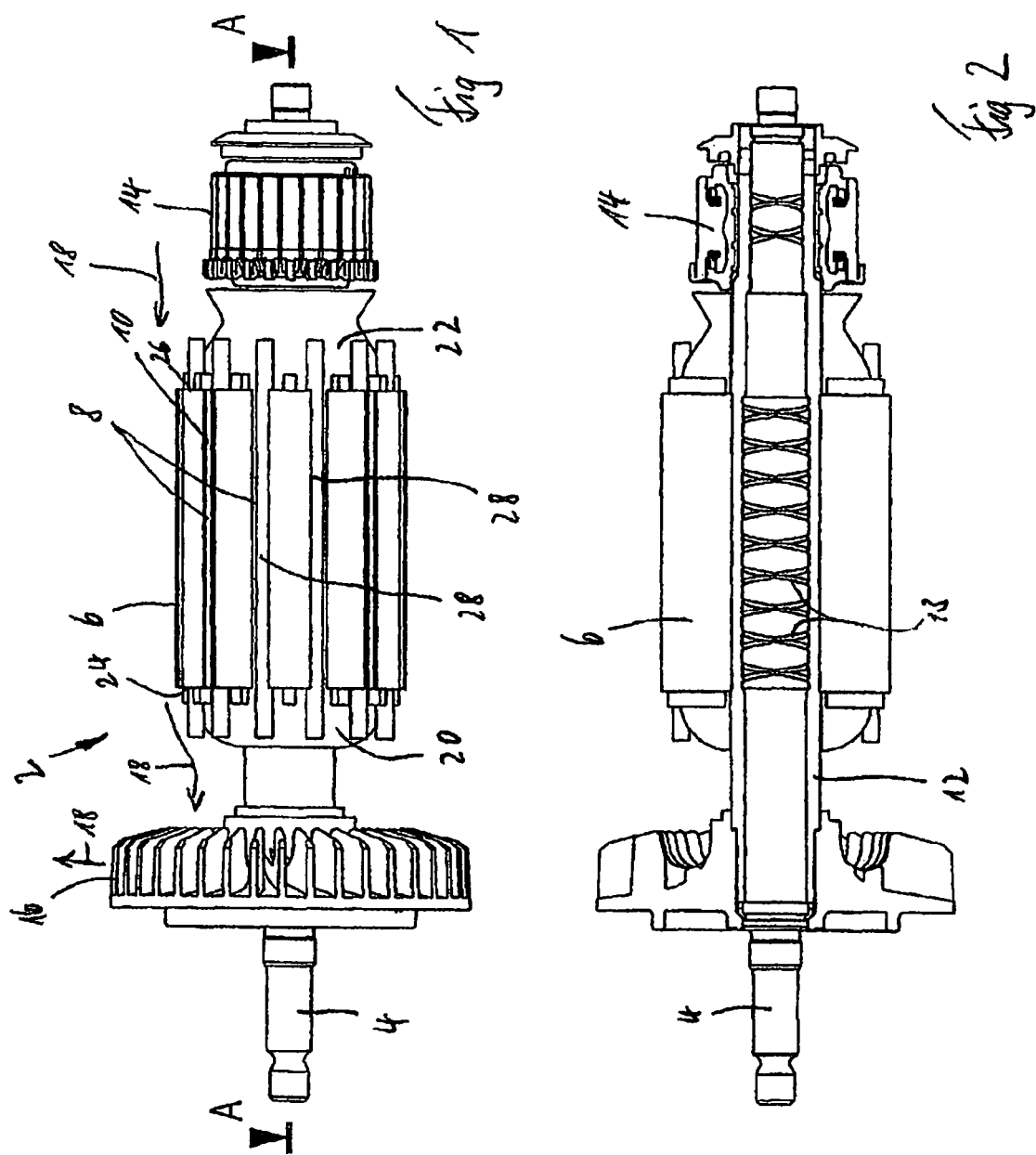

ROTOR FOR A FORCED-AIR-COOLED ELECTRIC MOTOR

This application is the national stage of PCT/EP2006/003146 filed on Apr. 6, 2006.

BACKGROUND OF THE INVENTION

The invention relates to a rotor for a forced-air-cooled electric motor, in particular a universal motor, especially for use with electrical power tools, with a laminated armature having longitudinal slots and with wire windings of a coil protruding from the longitudinal slots on the front face where the windings form a coil connecting head.

With forced-air-cooled electric motors, in particular electrical power tools, e.g. angle grinders or drilling machines, where particulate dirt, swarf or bore dust emerges in the course of processing, there is, in principle, the problem of an impairment of the rotor coil, in particular the coil connecting head(s) of the rotor coil, since particles and dust are dragged along with the cooling air stream and have an abrasive impact on the rotor coil.

There have already been suggestions made as to how to counter that. With DE 1 613 074 A, it was suggested to cover the coil connecting head of a rotor with a highly absorbent, flexible and porous inlay made of textile fabric, glass fiber or fleece soaked with impregnated resin. This is to achieve a resistant reinforcement of the coil connecting head after hardening.

With DE 196 20 840 A1, it was suggested to apply strip-shaped elements out of felt strips soaked with lacquer or epoxy resin to the coil connecting heads according to their arched form. This is to prevent the particles from impinging on the coil connecting head when the drive of the rotor rotates.

With EP 0 261 306 A2 and DE 298 21 112 U1, it was suggested to provide a cage at one of or both the coil connecting heads, the cage narrowing in a cone- or dome-shaped manner and made of two ring-shaped elements running concentrically relative to the longitudinal axis with inclined rods connecting these elements, the cage being attachable in a rotationally secure manner to the coil connecting head or the laminated armature or the collector and also providing protection against the impact of particles on the coil connecting head when the drive rotates.

The stated solutions are relatively complicated. The task of this invention is to suggest an effective and simple as well as inexpensively realizable protection of rotor coil connecting heads from abrasive wear.

SUMMARY OF THE INVENTION

With a generic rotor, this task is solved by the invention in that a rod is inserted in some of or all the longitudinal slots in the laminated armature, the rod being aligned in the longitudinal direction and protruding axially in the longitudinal direction from one or both of the front faces of the laminated armature, whereby the protruding rod ends thereby surround the coil connecting head on the respective front face.

With the invention it was realized that the longitudinal slots in the laminated armature—of which usually only about 55% are "filled" with wire windings—can provide mounting space for further rotor components. Furthermore, it was realized with the invention that, in the manner claimed, effective protection against the abrasive impact of particles on the rotor coil connecting heads can be implemented. When the drive of the rotor rotates with the electric motor operating at high speeds, the rods preferably protruding axially by 3 to 20 mm pass the front face of the laminated armature and build an extremely effective rotating shielding which allows little or no particle dust to impinge on the coil connecting head and damage the winding. Nevertheless, the electric motor and its rotor can be cooled effectively with an adequate cooling air stream. With the present invention, particles are repelled.

It would also be conceivable that the rod ends protruding axially past the front face are inclined or curved like an arch relative to the longitudinal axis, in particular following the narrowing form of the coil connecting head.

According to an embodiment of the rotor according to the invention, the rods are longer than the axial dimension of the laminated armature. Thus, the rods can protrude, in the longitudinal direction, past the front face of the laminated armature on both sides. Alternatively, it is also possible to use two correspondingly shorter rods in each slot.

It has proven to be advantageous and appropriate when the thickness of the rods is 1 to 5 mm. It is also advantageous to glue them into the longitudinal slots. The rods can be made of wood, metal, hard plastic or ceramic.

Furthermore, the invention relates to a vented electric motor. The task is to provide an electric motor which is continuously insensitive to wear and which provides protection of the rotor coil against the impact of particles in a simple and cost-effective way. It is likewise the task to make an electrical power tool insensitive to abrasive wear during operation in a simple and cost-effective way.

BRIEF DESCRIPTION OF THE DRAWING

Further characteristics, details and advantages of the invention are specified in the attached patent claims and the figure and subsequent description of a preferential embodiment of the rotor according to the invention. The drawings show the following:

FIG. 1 shows a side view of a rotor according to the invention; and

FIG. 2 shows a sectional view with section plane A-A of FIG. 1.

DESCRIPTION OF THE PREFERRED EMBODIMENT

The figures show a rotor for a vented electric motor, identified in general with reference numeral 2, in particular for an electrical power tool, e.g. a grinding or drilling tool. In the example, the rotor 2 contains a continuous rotor shaft 4, on which a laminated armature 6 is provided with a number of longitudinal slots 8 and a rotor coil 10. In the example, the metallic rotor shaft 4 has a plastic cladding 12. Either the laminated armature 6 with the rotor coil 10 is pressed onto this plastic-cladded rotor shaft 4 or the plastic is injected between the laminated armature 6 and the metallic part of the rotor shaft 4. One can see the grooves 13 on the surface of the metallic part of the rotor shaft 4 for a better holding of the plastic cladding. At any rate, the laminated armature 6 is mounted to the rotor shaft 4 in a rotationally secure manner. Furthermore, a collector 14 and a fan wheel 16 are provided, with which a cooling air stream is generated in the direction of the arrows 18 past the collector 14 and the laminated armature 16 in the direction of the fan wheel 16.

The longitudinal slots 8 carry a number of wire windings of the rotor coil 10 not specified in detail in the drawing. These wire windings form a first coil connecting head 20 in the direction of the fan wheel 16 and a second coil connecting head 22 in the direction of the collector 14. In addition to the wire windings, a rod 28 protruding by several millimeters past both front faces 24, 26 of the laminated armature is placed in each of the longitudinal slots 8. The respective rod 28 is inserted in the respective longitudinal slot 8 after mounting the rotor coil 10 and then rests against the wire windings of the rotor coil 10 from a radially outer direction. It is also conceivable that the respective rod is virtually wrapped, i.e. fed through the wire windings of the rotor coil 10. The wire windings of the rotor coil 10 are fixed and reinforced with resin impregnating material in the area of the coil connecting heads 20 and 22. Due to the impregnated resin, the rods 28 are also embedded and fixed in the longitudinal slots 8.

When the drive of the rotor 2 rotates, the protruding ends of the rods 28 build a rotating shield which prevents particles from being carried along in the cooling air stream to impinge on the coil connecting heads 20, 22 and wear them abrasively. Such a shield of rod ends protruding from the front faces 24, 26 can advantageously be used on the ventilator side and/or on the commutator side. The protruding ends of the rods 28 can also be inclined or curved to the inside relative to the longitudinal direction.

We claim:

1. A rotor for a forced-air-cooled electric motor or for a universal motor and suitable for use with electrical power tools, the rotor comprising:
    a laminated armature having longitudinal slots;
    a coil having wire windings protruding past said longitudinal slots at ends thereof to form a coil connecting head;
    a plurality of rods, each of said rods inserted in one longitudinal slot of said laminated armature, aligned in a longitudinal direction and protruding axially in that longitudinal direction by 3 to 20 mm past one or both ends of said laminated armature,
    wherein protruding rod ends surround said coil connecting head, thereby forming a rotating shielding which allows little or no particle dust to impinge on said coil connecting head and damage said windings.

2. The rotor of claim 1, wherein said rods are longer than an axial dimension of said laminated armature in said longitudinal direction.

3. The rotor of claim 2, wherein said rods axially protrude past both ends of said laminated armature.

4. The rotor of claim 1, wherein a thickness of said rods is 1-5 mm.

5. The rotor of claim 1, wherein said rods are glued into said longitudinal slots.

6. The rotor of claim 1, wherein said rods are made of wood, metal, hard plastic or ceramic.

7. An electric motor having the rotor of claim 1.

8. An electrical power tool having the electric motor of claim 7.

* * * * *